United States Patent

Steveninck

[15] 3,695,049
[45] Oct. 3, 1972

[54] METHOD AND APPARATUS FOR BURYING A PIPELINE HAVING FIXED FLUIDIZATION MEANS

[72] Inventor: Johannes Van Steveninck, Rijswijk, Netherlands

[73] Assignee: Shell Oil Company, New York, N.Y.

[22] Filed: Jan. 11, 1971

[21] Appl. No.: 105,201

[30] Foreign Application Priority Data

Feb. 11, 1970 Great Britain............6,559/70

[52] U.S. Cl..........................................61/72.4, 37/63
[51] Int. Cl...............................F16l 1/00, E02f 5/02
[58] Field of Search.........61/72.4, 72.1, 72.3; 37/63; 229/450

[56] References Cited

UNITED STATES PATENTS 3,505,826  4/1970  Harmstorf..................61/72.4

OTHER PUBLICATIONS

Oil and Gas Journal (pub) of Aug. 18, 1969 page 52

Primary Examiner—Jacob Shapiro
Attorney—Harold L. Denkler and Theodore E. Bieber

[57] ABSTRACT

A pipeline having fluidization pipes provided with fluidization nozzels running along the pipeline and secured thereto. To bury the pipeline in the unconsolidated bottom of a body of water such as the seabed, the pipeline is laid on the seabed and water is pumped into the fluidization pipes; the water leaves the fluidization nozzels and fluidizes the seabed along the pipeline causing the pipeline together with the fluidization pipes to sink into the fluidized seabed.

10 Claims, 2 Drawing Figures

PATENTED OCT 3 1972 3,695,049

J. Van Steveninck
INVENTOR

METHOD AND APPARATUS FOR BURYING A PIPELINE HAVING FIXED FLUIDIZATION MEANS

BACKGROUND OF THE INVENTION

1. Field of the Invention

The invention relates to a method and apparatus for burying a pipeline in the bottom of a body of water.

2. Description of the Prior Art

Applicant's copending patent application Ser. No. 85,531, filed Oct. 30, 1970, and a commonly assigned patent application of P.J. DeGeeter, Ser. No. 40,407, filed May 25, 1970, disclose methods and apparatus for burying a pipeline in the bottom of a body of water by fluidizing the material of the bottom adjacent the pipeline to cause the pipeline to sink into the fluidized bottom material. In the methods according to these copending patent applications a fluidization device is pulled along the pipeline for fluidizing the bottom material adjacent to the pipeline.

Although these methods are suitable for burying pipelines of any length, applicant has found that for burying short lengths of pipe (lengths of up to about 500 meters) it is often economically and technically justified to use a simpler method.

SUMMARY OF THE INVENTION

The present invention provides a method for burying a pipeline in the bottom of a body of water by fluidization of bottom material which has the advantage that it is not necessary to pull a fluidization device along the pipeline.

In the method according to the invention a pipeline is provided with at least one fluidization pipe having fluidization openings or nozzles, the fluidization pipe runs along and is fixedly secured to the pipeline. The pipeline is buried in the bottom of a body of water by laying the pipeline on the bottom and supplying a fluidization fluid to the fluidization pipe(s) so that the fluidization fluid will pass through the fluidization openings or nozzles to fluidize the bottom material adjacent the pipeline. This causes the pipeline, together with the fluidization pipe(s), to sink into the bottom material.

DESCRIPTION OF A PREFERRED EMBODIMENT

Figure 1:
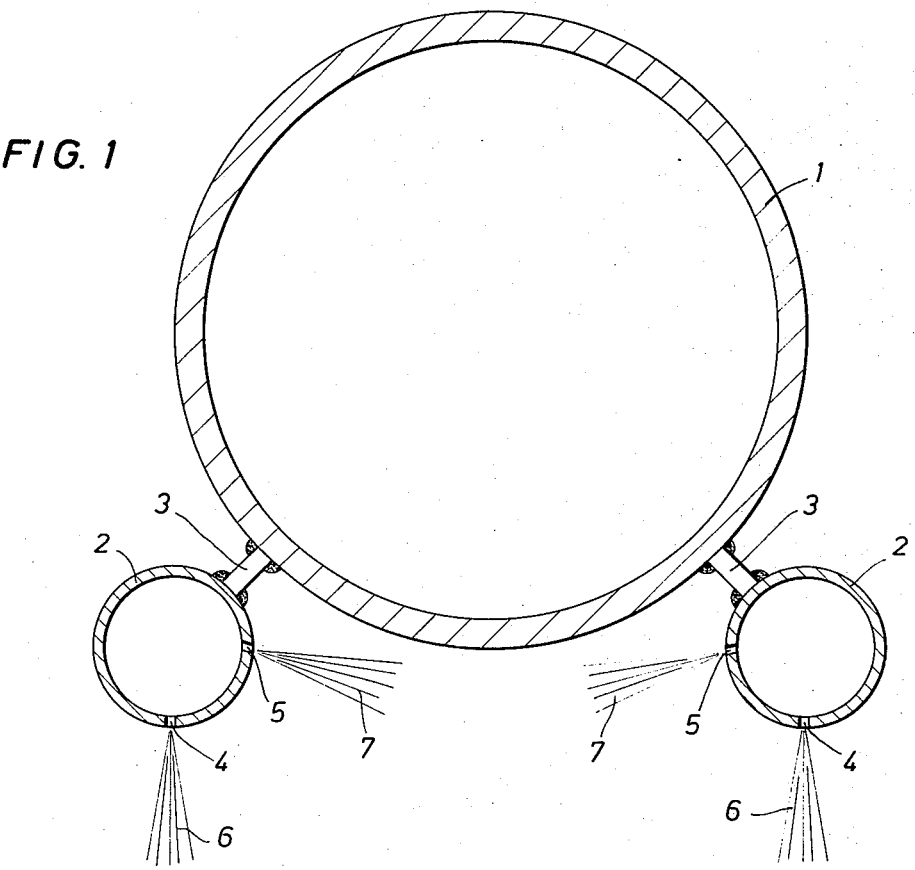
FIG. 1 shows a cross sectional view of a pipeline suitably equipped for the practice of the method of this invention.
Figure 2:
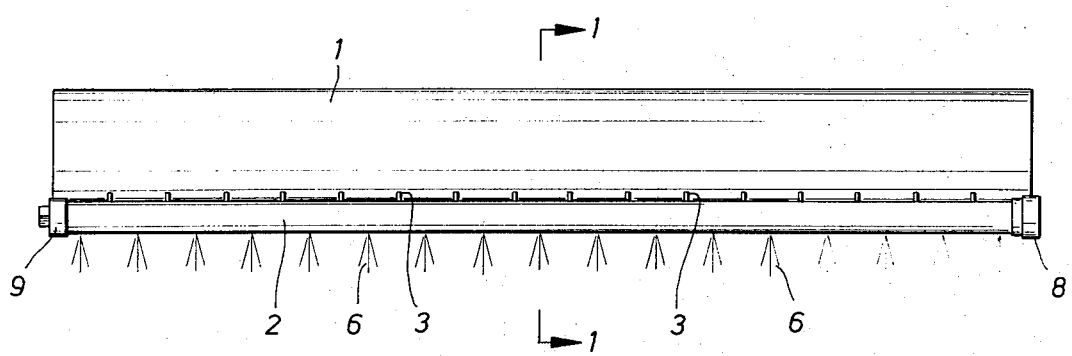
FIG. 2 shows a side view of the pipeline of FIG. 1 on a smaller scale.

Referring to the figures, we see a pipeline 1 of relative large diameter which is to be buried. Two fluidization pipes of smaller diameter are fixedly secured to the pipeline 1 by means of bars 3. The bars 3 can be welded at their ends, respectively, to the pipeline 1 and to the fluidization pipe 2. As shown clearly in the drawings, such a number of these bars 3 as is sufficient to provide spacing between the pipeline 1 and the fluidization pipe 2 are preferably positioned between the pipeline 1 and the fluidization pipe 2.

The fluidization pipes 2 are provided with two sets of fluidization openings or nozzles, indicated respectively by numerals 4 and 5. For best results, fluidization openings or nozzles 4 are directed downward, whereas fluidization openings 5 are directed slightly downward, for example, at an angle of 15° to the horizontal plane. In a preferred embodiment of the invention best results are obtained when about 60 percent of the fluidization openings or nozzles are directed downward and about 40 percent of the fluidization openings or nozzles are directed slightly downward.

At least one end of the fluidization pipes 2 is preferably provided with a connecting means such as joint or coupling 8 for connecting them to pumps (not shown) which supply a fluidization fluid, for example water, to the fluidization pipes 2. These pumps can be located, for example, on a small vessel or on shore.

One end of each fluidization pipe 2 can be closed with a closing means such as plug 9 and fluidization fluid can be supplied at the other end of each pipe. It is, moreover, possible to provide each fluidization pipe with one or more inlets between the ends of each fluidization pipe, the said inlets serving for supplying extra fluidization fluid to the fluidization pipe.

The diameter of each fluidization pipe 2 has to be large enough to prevent too much pressure loss over the length of the pipe. For best results, the total cross-sectional area of the fluidization pipes 2 is at least 1/20 of the cross-sectional area of the pipeline 1 which is to be buried. For instance, for a pipeline 1 having a diameter of 36 inches two fluidization pipes 2 each having a diameter of at least 6 inches are adequate, provided that the length of the pipeline to be buried does not exceed 500 meters.

The total area of the fluidization openings or nozzles 4 and 5 is advantageously about 1/1500th of the area covered by the underside of the fluidization pipes. The diameter of the fluidization openings or nozzles 4 and 5 depends on the diameter of the pipeline 1 to be buried but has to be at least 3 mm to prevent stopping up of the openings. The spacing between the openings 4 and 5 is preferably at least 15 cm but depends again on certain factors such as the nozzle diameter and the diameter of the pipeline 1 to be buried.

To bury the pipeline 1 according to the method of the invention, during, or after laying of the pipeline 1 on the bottom of a body of water, such as the seabed, fluidization fluid is supplied to the fluidization pipes 2. The fluidization fluid is preferably water or a mixture of water and air. The water is supplied by means of pumps and hoses or pipes to the fluidization pipes 2 at a pressure of at least 2 atmospheres. This water leaves the fluidization openings or nozzles 4 and 5 as indicated by numerals 6 and 7. The water jets 6 and 7 penetrate the bottom material of the seabed and fluidizes this material.

The weight of the pipeline 1, which is advantageously provided with an outer layer of concrete for ballasting, will cause the pipeline to sink into the fluidized bottom material until the desired depth has been reached. In order to raise the weight of the pipeline 1, it is advantageous to fill the pipeline 1 with a liquid, for example water. The ballasting of the pipeline 1 assists the pipeline 1 in sinking into the fluidized bottom material.

After the pipeline 1 has reached the desired depth the supply of fluidization liquid is stopped and the fluidization pipes 2 are disconnected from the source of supply of fluidization fluid. Since the fluidization pipes 2 are fixedly secured to the pipeline 1, the pipes sink into the bottom material together with the pipeline 1 and remain in the bottom with the pipeline 1. In other words, after burying the pipeline 1, the fluidization pipes 2 are lost.

The method of this invention is particularly suited to the burying of pipelines which are not too long, for example those having a length of up to about 500 meters, since the complication of pulling a fluidization device along the pipeline is avoided. Furthermore, as compared with the methods as proposed earlier, no transportation of rather complicated fluidization equipment is necessary.

In the embodiment as shown in the drawings two fluidization pipes are shown. Instead it is possible to use more than two pipes or one fluidization pipe, arranged below the center of the pipeline. The pipeline 1 and/or the fluidization pipes 2 may be made of metal or other material, for example plastic. If a welding of the fluidization pipes 2 to the pipeline 1 is not desirable, the fluidization pipes 2 can be fixedly secured to the pipeline 1 by any other suitable means. For example, clamping bands can be used to secure the pipeline to the fluidization pipes 2 together with spacing blocks for maintaining separation between the fluidization pipes 2 and the pipeline 1.

I claim as my invention:

1. A method of burying a pipeline in the bottom of a body of water which comprises immoveably affixing at least one fluidization pipe having fluidization openings along the length thereof to the exterior of the pipeline, the fluidization pipe running along and substantially parallel to the pipeline with the fluidization openings opening substantially away from the pipeline;

laying the pipeline on the bottom of the body of water with the fluidization pipe positioned on the lower portion of the pipeline; and supplying a fluidization fluid to the fluidization pipe at a pressure sufficient to cause the fluidization fluid to pass through the fluidization openings to fluidize the bottom of the body of water adjacent the pipeline, whereby the pipeline sinks into the bottom of the body of water.

2. The method of claim 1, wherein two fluidization pipes are affixed in a symmetrical manner to the exterior of the lower part of the pipeline.

3. The method of claim 1 wherein the fluidization fluid comprises water.

4. The method of claim 3 wherein the fluidization fluid is a mixture of water and air.

5. A fluid conduit adapted to be buried in the unconsolidated bottom of a body of water by fluidizing the unconsolidated bottom material which comprises a relatively large diameter pipeline;

at least one fluidization pipe of smaller diameter having a plurality of selectively oriented fluidization openings along the length thereof through which fluid may be jetted from the interior of the fluidization pipe;

means for affixing the fluidization pipe to the exterior of the pipeline, the fluidization pipe being affixed to the pipeline to run along and substantially parallel to the pipeline with the selectively oriented fluidization openings oriented to open downwardly and below the pipeline when the conduit is in the operative position; and means for connecting the fluidization pipe to a supply of pressurized fluidization fluid whereby fluidization fluid may be flowed into the fluidization pipe and jetted through the fluidization openings to fluidize the unconsolidated bottom material.

6. The fluid conduit of claim 5 wherein two fluidization pipes are symmetrically affixed along the lower part of the pipeline.

7. The fluid conduit of claim 5 wherein the plurality of selectively oriented fluidization openings comprises at least two sets of fluidization openings, the first set being oriented to open substantially vertically downward when the conduit is in the operative position and the second set being oriented to open slightly downward at an angle of about 15° to a horizontal plane.

8. The fluid conduit of claim 7 wherein about 60 percent of the fluidization openings belong to the first set and about 40 percent of the fluidization openings belong to the second set.

9. The fluid conduit of claim 5 wherein the total cross-sectional area of the fluidization pipes is at least 1/20 of the cross-sectional area of the pipeline.

10. The fluid conduit of claim 5 wherein the selectively oriented fluidization openings have a diameter of at least 3 mm.

* * * * *